United States Patent
Mazzucchi et al.

(10) Patent No.: US 10,506,351 B2
(45) Date of Patent: Dec. 10, 2019

(54) HEARING ASSISTANCE DEVICE AND METHOD WITH AUTOMATIC SECURITY CONTROL

(71) Applicant: Sonova AG, Staefa (CH)

(72) Inventors: Michele Mazzucchi, Zürich (CH); Pascal Magnenat, Zurich (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/082,974

(22) PCT Filed: Mar. 11, 2016

(86) PCT No.: PCT/EP2016/055254
§ 371 (c)(1),
(2) Date: Sep. 7, 2018

(87) PCT Pub. No.: WO2017/152991
PCT Pub. Date: Sep. 14, 2017

(65) Prior Publication Data
US 2019/0090071 A1    Mar. 21, 2019

(51) Int. Cl.
*H04R 25/00* (2006.01)
*G06F 21/31* (2013.01)
*G06F 21/45* (2013.01)

(52) U.S. Cl.
CPC ........... *H04R 25/554* (2013.01); *G06F 21/31* (2013.01); *G06F 21/45* (2013.01); *H04R 25/505* (2013.01);
(Continued)

(58) Field of Classification Search
CPC ............................ H04R 2225/55; H04R 25/30
(Continued)

(56) References Cited

U.S. PATENT DOCUMENTS 7,221,928 B2    5/2007  Laird et al.
2010/0308999 A1  12/2010  Chornenky
(Continued)

FOREIGN PATENT DOCUMENTS

EP          2760225 A1    7/2014

OTHER PUBLICATIONS

International Search Report and Written Opinion of Application No. PCT/EP2016/055254; Applicant Sonova AG; dated Dec. 5, 2016; 12 pages.

*Primary Examiner* — Alexander Krzystan

(57) ABSTRACT

There is provided a hearing assistance device to be worn by a user, comprising: a microphone arrangement (12) for capturing audio signals from ambient sound, an audio signal processing unit (14) for processing the captured audio signals, and an ear-level output transducer (16) for stimulating the user's hearing according to the processed audio signals, at least one wireless interface (18, 20, 42, 44) for signal reception from an external device (11, 40), a context detection unit (46) for determining, by regularly analyzing signals received via the at least one wireless interface, present values of a set of context parameters, the context parameters being indicative of the present location of the hearing assistance device (10), with the context detection unit being configured to select, based on the determined location, one location context out of a plurality of location contexts as the presently valid location context, and a security control unit (48) for controlling security aspects of the hearing assistance device according to a security policy selected from a plurality of security policies, each security policy specifically setting security levels for access to services of the hearing assistance device; wherein each location context is associated with one of the security policies, and wherein the security control unit is adapted to select that
(Continued)

| | Location context | Office | Home | Public | Church | HCP/Clinic |
|---|---|---|---|---|---|---|
| Context parameter („Fingerprint") | WLAN ID | 1 | 1 | | 1 | 1 |
| | BT beacon | 1 | 1 | | 1 | 1 |
| | Induction | | | 1 | 1 | |
| | GPS | | | 1 | 1 | |
| | HD ear-worn | + | | + | | |
| Security policy | Pairing | C | A | B | B | B |
| | Aunthentication | C | A | B | A | A |
| | Encryption | B | A | B | A | A |
| | Mic. access | B | A | B | B | A |
| | Data access | B | B | B | B | A | security policy which is associated with the presently valid location context.

16 Claims, 3 Drawing Sheets

(52) U.S. Cl.
CPC ............ *H04R 25/55* (2013.01); *H04R 25/70* (2013.01); *H04R 2225/41* (2013.01); *H04R 2225/51* (2013.01); *H04R 2225/55* (2013.01)

(58) Field of Classification Search
USPC .................................................. 381/314, 315
See application file for complete search history.

(56) References Cited

U.S. PATENT DOCUMENTS

| | | | | |
|---|---|---|---|---|
| 2013/0343585 A1* | 12/2013 | Bennett | ................ | H04R 25/554 381/315 |
| 2014/0010378 A1* | 1/2014 | Voix | ..................... | H04R 1/1083 381/57 |
| 2016/0180093 A1* | 6/2016 | Goss | ....................... | G06F 21/57 726/1 |
| 2019/0090071 A1* | 3/2019 | Mazzucchi | ............. | G06F 21/31 |

* cited by examiner

|  | Location context | Office | Home | Public | Church | HCP/Clinic |
|---|---|---|---|---|---|---|
| Context parameter („Fingerprint") | WLAN ID | 1 | 1 |  | 1 | 1 |
|  | BT beacon | 1 | 1 |  | 1 | 1 |
|  | Induction |  |  | 1 | 1 |  |
|  | GPS |  |  | 1 | 1 |  |
| Security policy | HD ear-worn | + |  | + |  |  |
|  | Pairing | C | A | B | B | B |
|  | Aunthentication | C | A | B | A | A |
|  | Encryption | B | A | B | A | A |
|  | Mic. access | B | A | B | B | A |
|  | Data access | B | B | B | B | A |

FIG. 3

HEARING ASSISTANCE DEVICE AND METHOD WITH AUTOMATIC SECURITY CONTROL

The invention relates to a hearing assistance device to be worn by a user, typically at ear level, comprising a microphone arrangement for capturing audio signals from ambient sound, an audio signal processing unit for processing the captured audio signals and an ear level output transducer for stimulating the user's hearing according to the processed audio signals, and further comprising an at least one wireless interface for signal reception from an external device, such as a GPS signal, a Bluetooth signal or a WLAN signal.

In general, a hearing assistance device (hereinafter also referred to as "hearing device"), such as a hearing instrument, provides for different services (including access to data and signals provided by the hearing assistance device) in different contexts. Typically, a certain context is associated with a certain location of the hearing assistance device. For example, fitting of the hearing device, i.e. adjustment of hearing device settings, may be allowed only at the hearing care professional (HCP); activation of broadcasts may only be allowed in certain buildings; and button-based program toggle e.g. may be disabled at a hair dresser.

The security requirements for different contexts/locations may be significantly different. However, for example, security requirements may be low for trusted locations, such as at home, whereas higher security requirements apply for untrusted locations, such as open public spaces, for example at a church. However, explicitly switching the security policy for each context may be demanding and error-prone.

U.S. Pat. No. 7,221,928 B2 relates to a handset using, for example, a GPS, a carrier-based network or a WLAN to determine the location of the handset. The handset includes body sensors, such as temperature or heart rate, so that an emergency case can be detected and, once an emergency has been detected, a message can be sent from the handset to a server with information concerning identity, location of the handset and the circumstances of the emergency.

EP 2 908 550 A1 relates to a hearing aid which comprises an accelerometer and/or a gyroscope or compass for determining motion patterns and location of the hearing aid; such location detection may be used in case that a free-fall of the hearing aid is detected from the motion pattern in order to avoid loss of the hearing aid. Once a free-fall has been detected, the hearing aid enters a low power mode, thereby disabling certain functions. Further, the hearing aid may automatically detect whether the hearing aid is worn at the ear or has been removed from the ear by monitoring, for example, temperature, wireless range between hearing aids, acoustical feedback paths, type of voice and heart pulse, and wherein, once removal from the ear has been detected, the hearing aid enters a low power or sleep mode to minimize energy consumption.

US 2009/0087003 A1 relates to an earpiece comprising an internal microphone, an internal speaker and a transceiver with an antenna for wireless communication with a mobile phone. The earpiece and the mobile phone cooperate in a manner so as to confirm the identity of a user using biometric information, in particular an in-ear acoustic response, including otoacoustic emission. The mobile phone includes an authorization unit which is adapted for providing access to one or more sets of user functions if a match is identified.

U.S. Pat. No. 8,808,160 B2 relates to a method and a device for providing therapy using spontaneous otoacoustic emission (SOE) analysis. It is mentioned in U.S. Pat. No. 8,808,160 B2 that SOE has been used as a biometric signature for a mobile phone personal identifier.

US 2006/0093997 A1 relates to an earpiece with biometric sensors for therapy evaluation for treating hearing loss or tinnitus.

DE 10 2005 046 168 A1 relates to a hearing instrument wherein the setting of the hearing instrument is adjusted according to biometric data measured by the hearing instrument; alternatively or in addition, the measured biometric data can be sent to an external device.

US 2013/0142365 A1 relates to a system for determining from an audio signal captured from a speaker by a hearing device the identity of the speaker, so that specific information concerning the identified speaker can be retrieved.

It is an object of the invention to provide for a hearing assistance device wherein security aspects of the operation of a hearing assistance device are handled in an efficient and user-convenient manner. It is a further object to provide for a corresponding method of providing hearing assistance to a user.

According to the invention, these objects are achieved by a hearing assistance device as defined in claim 1 and a hearing assistance method as defined in claim 34, respectively.

The invention is beneficial in that, by automatically determining context parameters indicative of the present location of the hearing assistance device by regularly analyzing signals received via the wireless interface(s) of the hearing assistance device and by automatically selecting the security policy associated with the determined location context, the security policy of the hearing assistance device can be automatically adjusted according to the present location context of the hearing assistance device such as "at home", "in the office", "at church", "open public space" or "at the audiologist", so that security aspects of the operation of the hearing assistance device can be optimized in a reliable manner while still allowing convenient use of the hearing assistance device.

Preferred embodiments of the invention are defined in the dependent claims.

Hereinafter, examples of the invention are illustrated by referenced to the attached drawings, wherein:

FIG. 3 is a table illustrating an example of security policies to be used in the invention.

Figure 1:
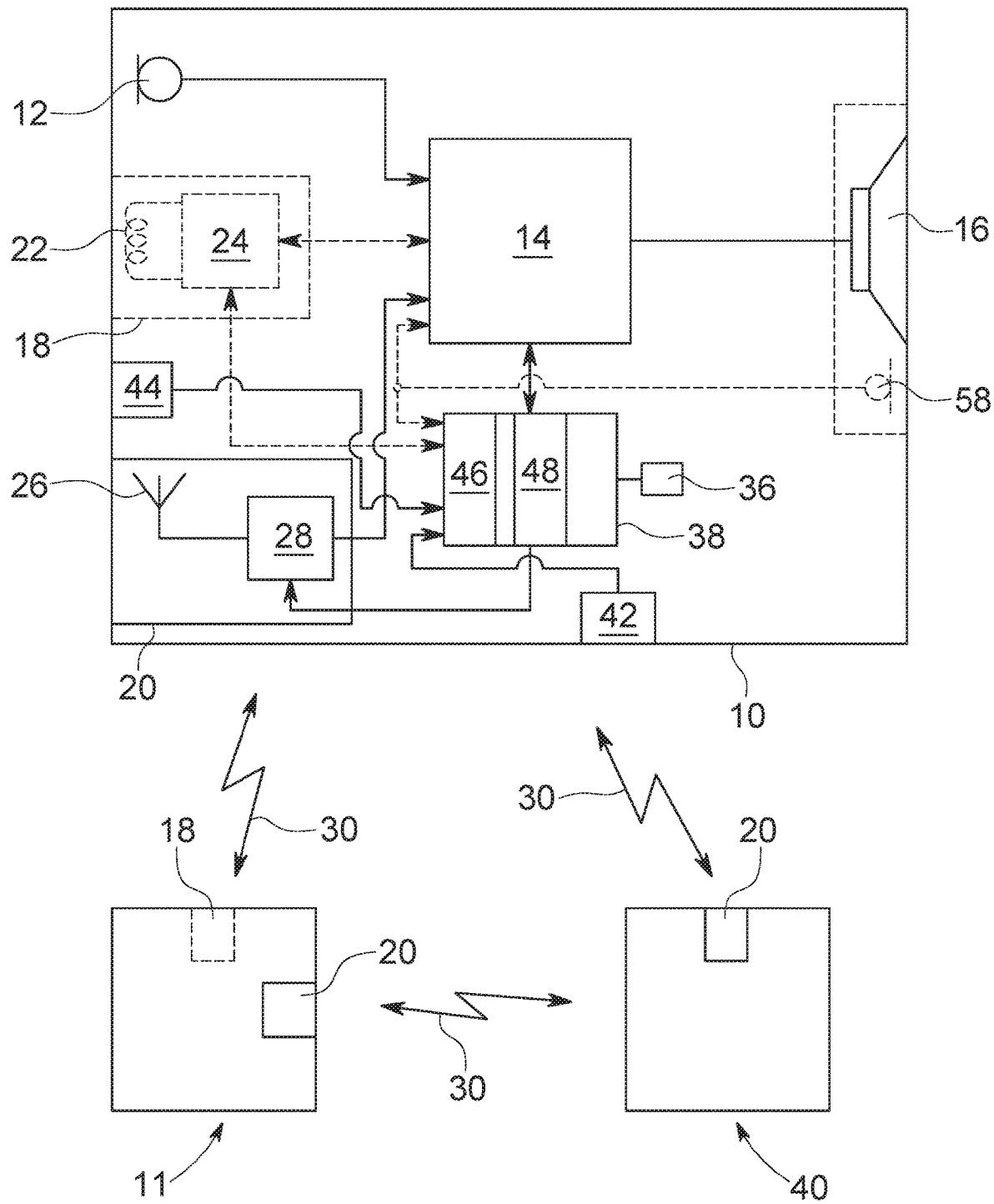
FIG. 1 is a schematic block diagram of a first example of a hearing assistance device according to the invention.

FIG. 1 is a block diagram of an example of a system comprising a first hearing assistance device 10 to be worn at one ear of a user, a second hearing assistance device 11 to be worn at the other ear of the user and at least one external device 40 which may be, for example, a smartphone.

The first and second hearing assistance devices 10, 11 typically are ear level devices and preferably form a binaural hearing system.

Preferably, the hearing devices 10, 11 are hearing instruments, such as BTE (behind-the-ear), ITE (in-the-ear) or CIC (completely-in-the-channel) hearing aids. However, the hearing devices, for example, also could be an auditory prosthesis, such as a cochlear implant device.

In the example of FIG. 1, the hearing assistance devices 10, 11 are hearing aids comprising a microphone arrangement 12 for capturing audio signals from ambient sound, an audio signal processing unit 14 for processing the captured audio signals and an electro-acoustic output transducer (loudspeaker) 16 for stimulation the user's hearing according to the processed audio signals (these elements are shown in FIG. 1 only for the hearing aid 10).

The hearing aids 10, 11 comprise a wireless interface 20 comprising an antenna 26 and a transceiver 28.

The interface 20 is provided for enabling wireless data exchange between the first hearing aid 10 and the second hearing aid 11 via a wireless link 30 which serves to realize a binaural hearing assistance system, allowing the hearing aids 10, 11 to exchange audio signals and/or control data and status data, such as the present settings of the hearing aids 10, 11.

The interface 20 is also provided for data exchange via a wireless link 30 from an external device 40, for example for receiving an audio data stream from an external device 40 acting as an audio source, comprising a wireless interface 20.

For example, the interface 20 may be adapted to operate in a frequency range of 0.38 GHz to 5.825 GHz, preferably at frequencies around 2.4 GHz in the ISM band. Typically, the interface 20 is a Bluetooth interface; alternatively, it may use another standard protocol or proprietary protocol.

The hearing aids 10, 11 also comprise a controller 38 for controlling operation of the hearing aids 10, 11, with the controller 38 acting on the signal processing unit 14 and the transceiver 28, and a memory 36 for storing data required for operation of the hearing aid 10, 11 and data required for operation of the interface 20, such as pairing/network data.

While the binaural link between the hearing devices 10, 11 may be realized by the wireless interfaces 20 which are also used for the connection with the external devices, the binaural link alternatively could be realized by a separate interface using a different technology, such as an inductive link or a proprietary protocol. An example is shown in dashed lines in FIG. 1, according to which the hearing aids 10, 11 in addition to the interface 20 comprise a second interface 18, including an antenna 22 and a transceiver 24, which is used for realizing the wireless data exchange between the first hearing aid 10 and the second hearing aid 11 via the wireless link 30—rather than using the interface 20 to this end. For example, the second interface 18 may be designed to form part of a hearing instrument body area network (HIBAN) using an inductive link which may operate, for example, in a frequency range of 6.765 MHz to 13.567 MHz, such as at 10.6 MHz. However, rather than being implemented as an inductive link, the binaural wireless link 30 may be a far-field link requiring, such as a proprietary or standard digitally modulated link operating in the 2.4 GHz ISM band.

The hearing devices 10, 11 may include additional wireless interfaces, such as a WLAN interface 42 for receiving WLAN signals and a GPS interface 44 for receiving GPS signals.

The hearing assistance device 10 further comprises a context detection unit 46 and a security control unit 48 which may be functionally implemented, for example, as part of the controller 38. The context detection unit 46 is provided for regularly analyzing signals received via the wireless interfaces 18, 20, 42, 44 in order to determine the present values of a set of context parameters which are indicative of the present location of the hearing device 10. Based on the thus determined location, the context detection unit 46 selects one location context out of a plurality of location contexts as the presently valid location context.

For example, the plurality of location contexts may include the following: "in the office", "at home", "open public space", "at church", and "at the audiologist"/"at the clinic". These locations/location contexts may be identified by their typical wireless signals: for example, in the office, at home and at the audiologist/clinic typically there will be WLAN signals from a certain network, so that an identification of the respective network name allows for a relatively reliable conclusion concerning the present location of the hearing device 10. Also a church may be equipped with a WLAN. Similarly, at home, in the office, in a church or at the audiologist/clinic, there may be a typical Bluetooth environment which may be identified by the hearing device (by receiving Bluetooth beacons via the interface 20), allowing for a relatively reliable conclusion concerning the present location of the hearing device 10. Further, location contexts like "open public space" and "at church" may comprise audio frequency induction loops for hearing instruments and accordingly may be identified by detection of such induction signals at the interface 18 of the hearing device 10. Finally, also GPS signals received via the interface 44 may be used for identifying a certain location context according to the respective GPS coordinates, such as a church or a certain public space.

Often it may be sufficient for identification of a certain location context to find that at least one of these context parameters has the correct value (for example, that the name of the WLAN is "home"); for example, the values of the context parameter "WLAN" would be the respective name of the network, and the values of the context parameter "GPS" would be the respective coordinates. The context parameters thus can be considered as "context fingerprints" which are indicative of the respective location.

For example, each location context may be defined based on a specific combination of values of the set of context parameters.

The context parameters may be defined by machine learning and by using statistical methods, such as probabilistic matching of values of the context parameters, so as to minimize the instability of individual wireless signal sources, such as GPS reflections, WLAN spoofing, etc.

For example, once the user has physically accessed a new location context for the first time (such as a certain church), the hearing device 10 may allow the user to add this new location context to the set of known location contexts. Preferably, the hearing device is configured to grade the reliability of the respective location context (for example, the number of sampled wireless signal sources may be an indicator of the reliability) and to decide if the reliability of a certain location context is sufficient to consistently and reliably recognize this location context in the future. In other words, the context detection unit 46 may be configured to assess the reliability of the selection of each location context by assessing the reliability of the respective determining of the values of the context parameters and to remove a location context from the set of location contexts if the reliability is found to be below a predefined threshold reliability.

In addition to the wireless signals received via the wireless interfaces, the context detection unit 46 may regularly analyze audio signals captured by the microphone arrangement 12 so as to determine the values of the context parameters. In particular, the context detection unit 46 may regularly analyze the captured audio signals in order to identify soundscape patterns (a "soundscape" is the component of the acoustic environment that can be perceived by a person; in other words, a soundscape is a sound or combination of sounds that forms or arises from an immersive environment).

The determination of the presently valid location context is used for automatically controlling security aspects of the hearing assistance device 10 according to the respective location context. To this end, a plurality of security policies is defined, each security policy specifically setting security levels for access to services of the hearing assistance device, wherein each location context is associated with one of the security policies, and wherein the security control unit 48 selects that security policy which is associated with the presently valid location context.

The services of the hearing device 10 may include at least one of: pairing with external devices, such as the device 40, wireless transmission of signals to external devices, such as to the device 40, capturing of audio signals via the microphone arrangement 12, provision of internal status data of the hearing device 10, such as the presently active hearing program, battery status, etc., and authentication of the user of the hearing device 10. Accordingly, the security levels of the security policies may include at least one of: security level for pairing with external devices, level of encryption of signals sent from the hearing device 10 to external devices (such as to the other hearing device 11 of the binaural system), security level for access to the audio signals captured by the microphone arrangement 12, security level for access to status data of the hearing device 10, security level for full access to the memory of the hearing device 10, and security level for authentication of the user of the hearing device 10.

The settings of the security levels may include, for example, the following "values": "no protection" (or "unconditioned service access"); "explicit enablement by user interaction" (for example, enablement requires a certain gesture of the user); "detection that the hearing device is worn by the dedicated user" (this will be discussed in more detail below); and "no access enabled" (i.e. the respective service is generally blocked at this security level).

For example, the security levels for pairing may allow, at a low security level, pairing for every device, and may require, at a high security level, a pairing gesture to be performed by the user. The encryption of signals sent to external devices may be switched off at low security levels, it may be simple at an intermediate security level and it may be complex at a high security level. Authentication by the user may require no authentication at all at low security level, and it may require user interaction, a key stored in the hearing device or determination of biometric measurements at higher security levels.

A certain security policy may be defined by default, it may be defined during sales or during fitting, and/or it may be modified by the user; such definition/modification of security policies utilizes an appropriate user interface (for example, the external device 40, which may be a smartphone, may provide for such user interface).

Once the context detection unit 46 has detected that the current location context has changed, it may not only direct the security control unit 48 to apply the appropriate security policy; in addition, the context detection unit 46 may direct the hearing device 10, for example, to issue a corresponding notification to the user (typically as a corresponding acoustic message).

According to one embodiment, the hearing assistance device is able to detect whether the hearing assistance device is presently worn by the detected user so that the hearing assistance device is able to provide for user authentication. Such user identification can be used, for example, as one of the settings of the security levels, so that a certain location context may require user authentication/identification for a certain hearing assistance device service. Since a hearing assistance device usually is to be worn at ear level, the user identification function of the hearing assistance device determines whether the hearing assistance device is worn at or in the ear. This can be preferably achieved by measuring at least one biometric property of the user's ear channel, such as the frequency response of the ear channel, the acoustic reflectivity of the ear channel and/or the optoacoustic emissions.

Figure 2:
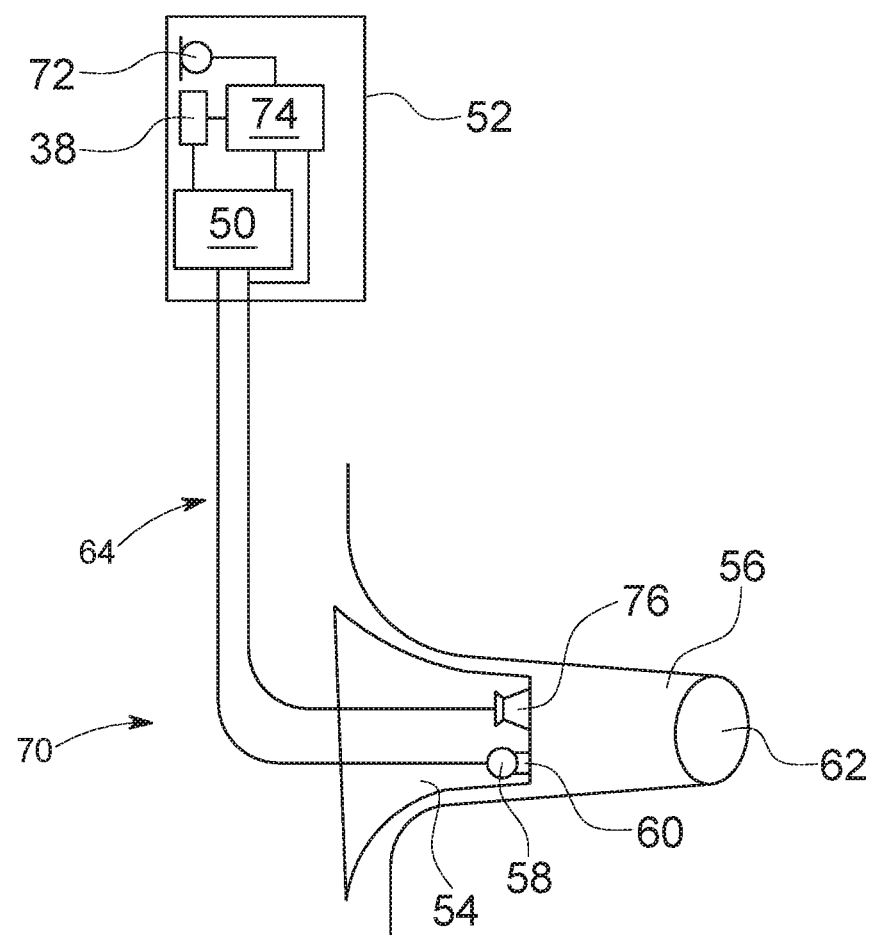
FIG. 2 is a schematic block diagram of a second example of a hearing assistance device according to the invention.

An example of a hearing assistance device including a user identification function is schematically shown in FIG. 2. The hearing assistance device 10 comprises a user identification unit 50 for providing an output indicative of whether the hearing assistance device 10 is presently worn by the user in the ear channel 26. The hearing assistance device 10 of FIG. 2 is of the RIC (receiver-in-the-canal) type and comprises a BTE (behind-the-ear) unit including the microphone arrangement 12, the interfaces 18, 20, 42, 44, the signal processing unit 14 and the controller 38 with the memory 36; the hearing assistance device 10 further comprises an earpiece 54 to be worn in the ear channel 56 and including the speaker 16 and an auxiliary microphone 58 which is acoustically connected to the ear channel 56 via a sound channel 60 extending towards the ear drum 62. The earpiece 54 is connected to the BTE unit 52 via cable connection 64.

The auxiliary microphone 58 is provided for capturing sound from the ear channel 56, wherein the audio signals captured by the auxiliary microphone 58 are analyzed by the user identification unit 50. According to one example, the user identification unit 50 may generate a test audio signal which is supplied to the speaker 16 in order to apply test sound to the ear channel 56 in order to measure the response to such test sound by analyzing the audio signals captured by the auxiliary microphone 58.

According to another example, the hearing assistance device 10 is configured to make the user speak a test speech sequence (by presenting an appropriate acoustic message to the user), wherein the signal captured by the auxiliary microphone 58 in order to obtain the in-ear response to the test speech sequence as one or more biometric properties of the user's ear channel 56.

The biometric authentication process requires that first reference data is obtained and stored in the memory 36 of the hearing assistance device 10; such reference data may be obtained by conducting at least one appropriate reference measurement, thereby achieving an enrolment of the biometric authentication. For deciding whether the hearing assistance device 10 is presently worn at the user's ear a current measurement of the at least one biometric property is conducted, and the current data obtained by such measurement is compared to the reference data in order to decide whether the hearing assistance device 10 is presently worn at the user's ear. For example, the identification unit 50 may decide that the hearing assistance device 10 is presently worn at the user's ear in case that the difference or deviation between the current measurement data and the reference measurement data is below a certain confidence threshold.

It has to be taken into account that hearing instruments, in particular hearing aids of the RIC type, are sensitive to large variability of placement, such as the depth in the ear channel, rotation of the device in the ear channel, obstruction of the device by ear wax, etc. Therefore, a single static measurement step may require too many samples or may be unsuitably accurate. Thus, the user identification unit 50 preferably builds a biometric data pool suitable to accommodate such variability autonomously and over a certain range of time, wherein at power-up of the device 10 a sequence of samples is taken in order to extract the relevant biometric features; once a stable sample has been found, it is inserted into a pool of samples if it exceeds a given degree of variability with respect to the pool; this enrolment process is terminated when no significant variability has been encountered for a certain number of iterations. In this regard it is also to be taken into account that biometric properties of the ear are not necessarily constant, since they may change, for example, with the age of the user, thus requiring periodic maintenance of biometric data. For example, the enrolment process, i.e. the measurement of the reference data, may be regularly repeated in order to account for such changes in the biometric properties or the measurement device, i.e. the hearing assistance device 10.

The measurement process of both the reference data and the current data may be adapted to the sensitivity of the measurement data to variability.

In general, once the enrolment process is terminated, user identification may be performed at any desired point in time.

According to one example, the breadth of the biometric samples may be variable in order to provide for a variable security level of the authentication; i.e. the reliability of the user identification may be adjusted to the present use situation/location context of the hearing assistance device.

The above described user identification by the hearing assistance device is beneficial in that it is convenient to the user due to the automatic procedure and in that it uses mostly resources which are already provided for the normal operation of a hearing device, such as the speaker and an earpiece microphone. Further, since the hearing device is continuously worn in the ear channel, the identification process may be performed at any desired point in time. The user identification may provide for physical theft protection, for subscription to certain services, for enhanced security for access to hearing device services, and for user authentication on demand.

According to one example, a user identification may be conducted upon each power-up of the hearing assistance device prior to activating services of the hearing assistance device, so that use of the hearing device by a non-authorized user can be prevented. Thus, identity-protected functionality of the hearing device is realized, wherein audiological functionality can be completely blocked for non-authorized users as a theft protection.

According to one embodiment, the hearing device may offer the user identification functionality in an external mode in the sense that the hearing device may act as a trusted third party biometric sensor or key. This enables an external device which is communicatively coupled to the hearing device to delegate authentication functionality to the hearing device and to receive an authentication grant from the hearing device. In such case the external device requests user authentication, the hearing device initiates the user identification by measuring the biometric data, and the external device receives the respective result (i.e. user authentication successful or not) from the hearing device.

According to an alternative embodiment, the hearing device may act as an untrusted third party biometric sensor; in this case the external device is provided with the functionality of the user identification unit 50 of the example of FIG. 2 in that the external device possesses the reference data concerning the relevant biometric properties and is able to generate the test audio signals and to analyze the audio signals captured in the ear channel 56 in response to stimulation by the test sound. In this case, the hearing device is only used for playing the test audio signals received from the external device via the speaker 16 to generate the test sound and to capture the audio signals in the ear channel 56 in response to the stimulation by the test sound via the auxiliary microphone 58, with the captured audio signals being communicated to the external device for analyze thereof.

According to one example, the external device may be a mobile device such as a smartphone, on which a certain application program is run which requires authentication of the user. According to another embodiment, the external device may be used for an online service requiring user authentication.

FIG. 3 shows an illustration of an example of a security policy, wherein it is shown by which context parameters various location contexts are identified and which security levels are required for each location context for various hearing device services. In the representation of FIG. 1 the symbol "1" means that at least one of the context parameters labelled by "1" has to be fulfilled for the respective location context; "A" designates a low security level, "B" requires that explicit enablement by user interaction, and "C" requires that the user identification unit recognizes that the hearing device is worn at ear level by the dedicated user. "+" means that for identification of the respective location context it is required that the user identification unit decides that the hearing device is worn at ear level.

The invention claimed is:

1. A hearing device, the hearing device comprising:
a microphone arrangement for capturing audio signals;
an audio signal processing unit for processing the captured audio signals;
an ear-level transducer for providing the processed audio signals;
a wireless interface for wireless signal reception from a device;
a context detection unit for determining values of a set of context parameters based on analyzing signals received from the wireless interface, the context parameters indicative of a present location of the hearing device, wherein the context detection unit is configured to select, based on the determined location, a location context from multiple location contexts;
a security control unit for controlling security aspects of the hearing device based on a security policy selected from a plurality of security policies, each security policy setting security levels for access to services of the hearing device based on the determined values of the set of the context parameters,
wherein each location context is associated with one of the security policies, and wherein the security control unit is adapted to select a security policy that is associated with a location context; and
a user identification unit configured to authenticate a user wearing the hearing device via a biometric measurement based on the selected security policy.

2. The hearing device of claim 1, wherein the security levels of the security policies include at least one of the following:
security level for pairing with external devices;
level of encryption of signals sent from the hearing device to external devices; security level for access to the audio signals captured by microphone arrangement; or
security level for access to status data of the hearing device, security level for full access to the memory of the hearing device, and security level for authentication of the user of the hearing device.

3. The hearing device of claim 1, wherein each location context is defined based on a specific combination of values of the set of context parameters.

4. The hearing device of claim 1, wherein the context detection unit is configured to analyze a GPS signal, a Bluetooth™ signal, a Wireless Local Area Network (WLAN) signal, or an electromagnetic induction loop signal.

5. The hearing device of claim 1, wherein the context detection unit is configured to analyze audio signals captured by the microphone arrangement to determine the values of the set of context parameters.

6. The hearing device of claim 1, wherein the context detection unit is configured to analyze the captured audio signals for identifying soundscape patterns.

7. The hearing device of claim 1, wherein the user identification unit is configured to generate, via a loudspeaker, a sound signal to encourage a user to speak and provide a sound sample to analyze, wherein the sample sound is captured by an earpiece microphone.

8. A method for using a hearing device, the method comprising:
    defining a plurality of location contexts based on context parameters, the context parameters indicative of a present location of a hearing device;
    defining a plurality of security policies, each security policy setting the security levels for access to services of the hearing assistance device,
        wherein each location context is associated with one of the security policies;
    receiving, via a wireless interface of the hearing device, a control signal from an external device;
    determining, by a context detection unit of the hearing device, present values of the context parameters;
    selecting, by the context detection unit, based on the determined location, one location context from the plurality of location contexts as a presently valid location context;
    selecting a security policy from the plurality of security policies that is associated with the presently valid location context;
    determining, via a processor, that a user is wearing the hearing device;
    authenticating, via the processor, the user based on receiving a biometric input from the user wearing the hearing device; and
    controlling security aspects of the hearing device based on the selected security policy.

9. The method of claim 8, wherein each location context is defined by using probabilistic matching of values of the context parameters.

10. The method of claim 8, wherein the security levels of the security policies are defined by default.

11. The method of claim 8, wherein the security levels of the security policies are defined and adjusted via a user interface.

12. A non-transitory computer-readable medium storing instructions that when executed by a processor cause a hearing device to perform operations, the operations comprising:
    receiving, via a wireless interface of the hearing device, a control signal from an external device;
    determining, by a context detection unit of the hearing device, present values of the context parameters based on the received control signal;
    selecting, by the context detection unit, based on the determined location, one location context from the plurality of location contexts as a presently valid location context;
    selecting a security policy from the plurality of security policies that is associated with the presently valid location context;
    determining, via the processor, that a user is wearing the hearing device;
    authenticating, via a processor, the user based on receiving a biometric input from the user wearing the hearing device; and
    controlling security aspects of the hearing device based on the selected security policy.

13. The non-transitory computer-readable medium of claim 12, the operations further comprising:
    sensing, via biometric sensor, a biometric measurement;
    transmitting the biometric measurement to the external device,
        wherein the external device is configured to use the biometric measurement to generate the control signal.

14. The method of claim 12, wherein each location context is defined by using probabilistic matching of values of the context parameters.

15. The method of claim 12, wherein the security levels of the security policies are defined by default.

16. The method of claim 12, wherein the security levels of the security policies are defined and adjusted via a user interface.

* * * * *